(12) United States Patent  (10) Patent No.: US 7,373,211 B1
Logsdon et al.  (45) Date of Patent: *May 13, 2008

(54) GRAPHICAL USER INTERFACE FOR COMPLIANCE MONITORING IN SEMICONDUCTOR WAFER FABRICATION AND METHOD OF OPERATION

(75) Inventors: George Logsdon, Arlington, TX (US); Gary Elmore, Arlington, TX (US); John T. Powell, Crowley, TX (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/252,367

(22) Filed: Oct. 17, 2005

Related U.S. Application Data

(63) Continuation of application No. 10/463,830, filed on Jun. 16, 2003, now Pat. No. 6,957,114, which is a continuation-in-part of application No. 10/299,949, filed on Nov. 19, 2002, now Pat. No. 6,957,113.

(60) Provisional application No. 60/408,817, filed on Sep. 6, 2002.

(51) Int. Cl.
 *G06F 19/00* (2006.01)
(52) U.S. Cl. .................. 700/99; 700/100; 700/121
(58) Field of Classification Search .......... 700/99–100, 700/103–104, 121; 705/8
See application file for complete search history.

(56) References Cited

U.S. PATENT DOCUMENTS

| | | | |
|---|---|---|---|
| 4,924,386 A | 5/1990 | Freedman et al. | |
| 5,044,314 A | 9/1991 | McNeilly | |
| 5,544,350 A | 8/1996 | Hung et al. | |
| 5,649,113 A | 7/1997 | Zhu et al. | |
| 5,745,652 A | 4/1998 | Bigus | |
| 5,946,212 A | 8/1999 | Bermon et al. | |
| 6,230,068 B1 | 5/2001 | Wu et al. | |
| 6,546,364 B1 | 4/2003 | Smirnov et al. | |
| 6,584,369 B2 | 6/2003 | Patel et al. | |
| 6,591,153 B2 | 7/2003 | Crampton et al. | |
| 6,615,092 B2 | 9/2003 | Bickley et al. | |
| 6,625,577 B1 | 9/2003 | Jameson | |
| 6,763,277 B1 | 7/2004 | Allen, Jr. et al. | |
| 6,816,746 B2 | 11/2004 | Bickley et al. | |
| 2002/0032495 A1 | 3/2002 | Ozaki | |
| 2002/0188597 A1* | 12/2002 | Kern et al. | 707/1 |
| 2003/0033180 A1* | 2/2003 | Shekar et al. | 705/7 |
| 2003/0109950 A1* | 6/2003 | Andrade et al. | 700/103 |
| 2005/0171627 A1* | 8/2005 | Funk et al. | 700/121 |
| 2007/0043464 A1* | 2/2007 | Zeif | 700/108 |

\* cited by examiner

*Primary Examiner*—Zoila Cabrera

(57) ABSTRACT

A system and method is disclosed for allocating multi-function resources among a plurality of tasks within a process system in semiconductor wafer fabrication. A resource allocator allocates multi-function resources among tasks within a process system that executes at least one application process. The resource allocator comprises a monitoring controller, model of the process system, a resource allocation controller, and a compliance-monitoring viewer. The compliance-monitoring viewer is operable to display process system information to illustrate plan compliance, information visualized over a time period of years, months, days, hours, seconds, microseconds or the like.

24 Claims, 10 Drawing Sheets

| | A | B | C | D | E | F | G | H |
|---|---|---|---|---|---|---|---|---|
| 1 | entity | event | transaction date | DIFF PLAN | compliance | delta 1 | shift | operator |
| 63 | 2VGATE 2 | PF 1588 LOAD | 02/20/2003 13:05:06 | 1588 | PLANNED | 4:26:11 | D | CGQTTE |
| 64 | 2VGATE 2 | PF 1588 LOAD | 02/20/2003 08:34:32 | 1588 | PLANNED | 2:18:19 | C | CLAPTE |
| 65 | 2VGATE 2 | PF 1389 LOAD | 02/20/2003 04:24:06 | 1389 | PLAN_<10 | 7:33 | C | CBCWTE |
| 66 | 2VGATE 2 | PF 1550 LOAD | 02/20/2003 00:29:30 | 1550 | PLANNED | 2:06:58 | C | CBCWTE |
| 67 | 2VGATE 2 | PF 1389 LOAD | 02/19/2003 20:48:16 | 1389 | PLANNED | 3:59:15 | B | CTMLTE |
| 68 | 2VGATE 2 | PF 1588 LOAD | 02/19/2003 16:39:29 | 1588 | PLAN_<60 | 47:26 | B | CTMLTE |
| 69 | 2VGATE 2 | PF 1550 LOAD | 02/19/2003 12:33:08 | 1550 | PLANNED | 1:15:32 | B | CTMLTE |
| 70 | 2VGATE 2 | PF 1588 LOAD | 02/19/2003 07:55:10 | 1588 | PLANNED | 3:38:37 | A | CMYATE |
| 71 | 2VGATE 2 | PF 1351 LOAD | 02/19/2003 02:57:42 | 1351 | PLANNED | 2:25:43 | A | CVGME |
| 72 | 2VGATE 2 | PF 1550 LOAD | 02/18/2003 19:56:15 | 1588 | CHANGED | 2:14:29 | B | CTMLTE |
| 73 | 2VGATE 2 | PF 1550 LOAD | 02/18/2003 15:55:10 | 1550 | PLANNED | 4:04:33 | B | CTMLTE |
| 74 | 2VGATE 2 | PF 1351 LOAD | 02/18/2003 10:43:28 | 1351 | PLANNED | 3:24:45 | B | CTMLTE |
| 75 | 2VGATE 2 | PF 1550 LOAD | 02/18/2003 06:47:25 | 1550 | PLANNED | 5:08:15 | A | CVGNTE |
| 76 | 2VGATE 2 | PF 1245 LOAD | 02/18/2003 01:30:16 | 1245 | PLANNED | 1:20:25 | B | CVGMTE |
| 77 | 2VGATE 2 | PF 1406 LOAD | 02/17/2003 19:46:51 | 1406 | PLANNED | 3:03:07 | B | CTMLTE |
| 78 | 2VGATE 2 | PF 1550 LOAD | 02/17/2003 15:19:48 | 1550 | PLANNED | 2:55:24 | B | CTMLTE |
| 79 | 2VGATE 2 | PF 1588 LOAD | 02/17/2003 10:01:09 | 1588 | PLAN_<60 | 42:44 | B | CTMLTE |
| 80 | 2VGATE 2 | PF 1406 LOAD | 02/16/2003 04:56:56 | 1406 | PLANNED | 1:18:54 | A | CVGMTE |
| 81 | 2VGATE 2 | PF 1228 LOAD | 02/16/2003 22:34:29 | 1228 | PLANNED | 2:57:42 | A | CKDATE |
| 82 | 2VGATE 2 | PF 1588 LOAD | 02/16/2003 15:53:53 | 1588 | PLANNED | 4:17:25 | A | CTMLTE |
| 83 | 2VGATE 2 | PF 1351 LOAD | 02/16/2003 11:00:25 | 1351 | PLAN_<60 | 46:38 | B | CTMLTE |
| 84 | 2VGATE 2 | PF 1351 LOAD | 02/16/2003 10:13:47 | 1351 | PLANNED | 5:09:23 | B | CCKSTE |
| 85 | 2VGATE 2 | PF 1351 LOAD | 02/16/2003 05:01:43 | 1351 | PLANNED | 4:35:10 | A | CVGMTE |
| 86 | 2VGATE 2 | PF 1550 LOAD | 02/16/2003 00:18:41 | 1550 | PLANNED | 3:32:21 | A | CVGMTE |
| 87 | 2VGATE 2 | PF 1389 LOAD | 02/15/2003 20:34:36 | 1389 | PLAN_<10 | 8:38 | D | CGQTEE |
| 88 | 2VGATE 2 | PF 1550 LOAD | 02/15/2003 16:29:47 | 1550 | PLANNED | 3:53:53 | D | CGQTTE |

FIG. 8

GRAPHICAL USER INTERFACE FOR COMPLIANCE MONITORING IN SEMICONDUCTOR WAFER FABRICATION AND METHOD OF OPERATION

This application is a continuation of prior U.S. patent application Ser. No. 10/463,830 filed on Jun. 16, 2003 now U.S. Pat. No. 6,957,114, which is a continuation-in-part of 10/299,949 filed Nov. 19, 2002 now U.S. Pat. No. 6,957,113, which claims benefit of 60/408,817 filed Sep. 6, 2002.

PRIORITY CLAIM TO PRIOR PATENT APPLICATIONS

This patent application claims priority as a continuation in part patent application to:

U.S. patent application Ser. No. 10/299,949 filed on Nov. 19, 2002, which claims priority to U.S. Provisional Patent Application No. 60/408,817 filed on Sep. 6, 2002;

U.S. patent application Ser. No. 10/447,324 filed May 28, 2003, which claims priority to U.S. patent application Ser. No. 10/299,949 filed on Nov. 19, 2002, which claims priority to U.S. Provisional Patent Application No. 60/408,817 filed on Sep. 6, 2002; and U.S. patent application Ser. No. 10/447,211, filed May 28, 2003, which claims priority to U.S. patent application Ser. No. 10/299,949 filed on Nov. 19, 2002, which claims priority to U.S. Provisional Patent Application No. 60/408,817 filed on Sep. 6, 2002.

Each of the above-identified patent applications is commonly assigned to the assignee of the present invention. The disclosures in these related patent applications are hereby incorporated by reference for all purposes as if fully set forth herein.

TECHNICAL FIELD OF THE INVENTION

The present invention is directed generally to resource allocation systems and process control systems and, more specifically, to graphical user interfaces for compliance monitoring in semiconductor wafer fabrication and related methods of operation.

BACKGROUND OF THE INVENTION

Allocation of multi-function resources within resource allocation and process control systems may be thought of as the management (i.e., administration, command, control, direction, governance, monitoring, regulation, etc.) of such multi-function resources (e.g., manufacturing tools, instruments, hardware, software, databases, communication/connectivity resources, transportation resources, facilities, utilities, inventories, etc.) among a variety of tasks within a process system.

Process systems may be arranged and implemented to manage large facilities, such as a manufacturing plant, a semiconductor fabrication facility, a mineral or crude oil refinery, or the like, as well as relatively smaller facilities, such as a corporate communications network, a data repository and management system, or the like. Such systems may be distributed or not, and typically include numerous modules tailored to manage various associated processes, wherein conventional means link these modules together to produce the distributed nature of the process system. This affords increased performance and a capability to expand or reduce the process system to satisfy changing needs.

Process systems are developed and tailored to satisfy wide ranges of process requirements, whether local, global or otherwise, and regardless of facility type. Such developers and users of such systems commonly have two principal objectives, to:

(i) centralize management/control of as many sub-processes or processes as possible to improve overall efficiency, and (ii) support a common interface that communicates data among various modules managing/controlling or monitoring the processes, and also with any such centralized controller.

Each process, or group of associated sub-processes or processes, has certain input (e.g., data, diagnostics, feed, flow, power, etc.) and output (e.g., data, pressure, temperature, utilization parameters, etc.) characteristics associated therewith. These characteristics are measurable, and may be represented in a discernable manner.

Predictive control methodologies/techniques may be used to optimize certain processes as a function of such characteristics. Predictive control techniques may use algorithmic representations to estimate characteristic values (represented as parameters, variables, etc.) associated with them that can be used to better manage such process resources among a plurality of tasks.

Such optimization efforts only account mathematically for the tasks being performed and the process resources then used to resolve the same based upon statistical characteristics only, thereby failing to model and factor into the optimization effort both status and logistical data, as well as to account for human capabilities and interaction (i.e., functions, skills, qualifications, task preferences, track records and the like) that ultimately utilize the process resources to resolve the tasks.

Conventional approaches can exhibit poor response to constantly changing or exigent circumstances, and as such fail to cooperatively optimize process resources, particularly process resources capable of performing multiple functions. What is needed in the art is a powerful and flexible means for dynamically analyzing and modifying process status in a real-time mode through allocation and reallocation of multifunction process resources among a plurality of tasks within a process system.

Using semiconductor fabrication as an example, in order to provide shortest cycle times, highest quality, timely-delivered cost-effective products that meet revenue growth plans, there is a continuous need to improve manufacturing processes and sub-processes, including the content and methods of delivering information to the operations staff.

Information about manufacturing tools and work in process ("WIP") inventory are critical to the decision making process necessary to operate a semiconductor wafer manufacturing line. With complex multi-tool, multi-technology, multi-product resources ("multi-function resources"), a need exists in the industry for a system and method that allocate such multi-function resources among a plurality of tasks within fabrication facility so as to execute a flexible process or plan that responds to WIP mix, resource availability changes, associate work schedule, skill sets (e.g., "queue-jumping" hot lots, special work requests, etc.), and the like to meet the requirements of a "just-in-time" environment.

Stated more broadly, a measurement of process efficiency can be defined by how quickly demands by requesting tasks are satisfied through the allocation of process resources. Today, even though human operators assist in the allocation of resources to requesting tasks, decisions to allocate such resources are controlled by management (whether human management based upon periodic reports (e.g., daily, weekly, monthly or, even, quarterly), or automated management based upon periodic batched data, or some combination of the two) which reacts or decides based upon relatively stale data, rather than reacting/deciding dynamically.

To that end, the ability to follow up on resource, as well as shift, sub-shift and individual (whether relative to a given resource or otherwise), performance is critical to the development of any planning system (or related cycle) that operates to maximize efficiencies in a "just-in-time" environment, such as a manufacturing area. Choices made during the planning cycle impact the overall productivity and effectiveness of tool resources (e.g., furnaces, etc.).

Therefore, a need exists for a system and method for efficiently allocating multi-function resources for a system process in semiconductor wafer fabrication. A further need exists for a process system and related graphical user interface ("GUI") through which management reacts timely relative to conventional systems based upon dynamic data. In particular, a need exists for GUIs, particularly, compliance-monitoring viewers, for association with systems for allocating multi-function resources in semiconductor wafer fabrication.

SUMMARY OF THE INVENTION

To address the above-discussed deficiencies of the prior art, it is a primary object of the present invention to provide systems, as well as methods of operating the same, for delivering graphical user interfaces ("GUIs"), particularly, compliance-monitoring viewers, for association with systems that allocate multi-function resources among a plurality of tasks in semiconductor wafer fabrication.

The compliance-monitoring viewer of the present invention enables management to measure plan effectiveness, for example, a plan used in the diffusion area where multi-function resources that have varying capabilities are used to produce product. Compliance-monitoring viewers, and related methods, produce graphs, tables, summaries and the like at individual tool, tool operator, shift, or other levels to enable plan-compliance review, including over a sliding-time horizon.

Broadly, such systems and methodologies enable real-time process automation through mathematical modeling of multi-function process resources (e.g., manufacturing tools, hardware, software, databases, communication/connectivity resources, transportation resources, facilities, utilities, inventories, etc.), and then allocating ones of such resources to perform various tasks within the process system, commonly in accord with at least one application process. It should be noted that such systems and methodologies may be suitably arranged to maintain a knowledge database and to modify the same to record past experiences, thereby enabling the same to be self-learning.

In accord with the principles of the present invention, an exemplary resource allocator is introduced that allocates such multi-function resources among a plurality of tasks within the process system executing the at least one application process. This resource allocator comprises a monitoring controller, a model of the process system and a resource allocation controller. An exemplary compliance-monitoring viewer is associated with the resource allocator, though in alternate embodiments, may be associated with the system in any suitable manner.

An exemplary monitoring controller monitors measurable characteristics associated with the executing application process, multi-function resources and related tasks, each of the measurable characteristics being one of a status characteristic and a logistical characteristic. An exemplary model represents mathematically the multi-function resources and the tasks, and defines relationships among related ones thereof as a function of the application process (e.g., one or more application processes, resources, tasks, etc.). An exemplary resource allocation controller operates the model in response to the monitored measurable characteristics and allocates ones of the multi-function resources among ones of the tasks within the process system to efficiently execute the at least one application process.

The suitably arranged compliance-monitoring viewer, or, more generally, GUI, may illustratively be associated with the process system via the resource allocator. The compliance-monitoring viewer is operable to transform real-time process system information into a multimedia format to enable supervisory interaction. The supervisory interaction may be from human management, from system management (self-learning or otherwise), or from some suitable combination of human management and system management.

In one advantageous embodiment, the GUI provides information for the simultaneous graphical display of real-time tool-resource data with logistical data. Query functions may utilize a command line option to perform customized query filters based on the unique implementation of scripts, making the exemplary embodiment "tool centered" as opposed to "inventory centered".

An advantageous embodiment for the present invention is a resource allocator for use in a diffusion process. For instance, a diffusion process in semiconductor wafer fabrication may be described as a process of depositing a dopant material onto a silicone substrate and diffusing the dopant material into the silicone substrate via thermal agitation (the diffusion process is preferably capable of executing a plurality of diffusion process plans).

An exemplary resource allocator operates to allocate a plurality of multi-function resources, or tools (e.g., furnaces (high temperature atmospheric pressure, low pressure chemical vapor deposition, doping (bbr3, pocl3, etc.), anneal, alloy, curing; etc.); wet chemical process stations (self contained, open bath, etc.); work in process controllers (stockers, transport modules, etc.); people (equipment loaders, operators, repair technicians, etc.), among a plurality of tasks of any given diffusion process plan. The resource allocator comprises a monitoring controller, a model and resource allocation controller.

During the diffusion process, meaning before, during and between execution of various diffusion process plans, the resource allocation controller operates to modify ones of the mathematical representations in response to the status or logistical characteristic data. In a related embodiment, the resource allocator comprises a data repository having at least a knowledge database, and the resource allocator further operates to modify the knowledge database in response to changes to or the condition/value of the status and logistical characteristic data to thereby enable the resource allocator to be self-learning.

Before undertaking a Detailed Description of the Invention, it may be advantageous to set forth a definition of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, coupled to or with, be communicable with, cooperate with, interleave, juxtapose, be proximate to, be bound to or with, have, have a property of, or the like; the term "memory" means any storage device, combination of storage devices, or part thereof whether centralized or distributed, whether locally or remotely; and the terms "controller," "processor" and "allocator" mean any device, system or part thereof that controls at least one operation, such a device, system or part thereof may be implemented in hardware, firmware or software, or some combination of at least two of the same.

It should be noted that the functionality associated with any particular controller or allocator may be centralized or distributed, whether locally or remotely. In particular, a controller or allocator may comprise one or more data processors, and associated input/output devices and memory that execute one or more application programs and/or an operating system program.

Additional definitions for certain words and phrases are provided throughout this patent document, those of ordinary skill in the art should understand that in many, if not most instances, such definitions apply to prior uses, as well as future uses, of such defined words and phrases.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is made to the following descriptions taken in conjunction with the accompanying drawings, wherein like numbers designate like objects, and in which:

FIG. 8 illustrates an exemplary display of information provided by an EXCEL spreadsheet that is associated with the compliance-monitoring viewers of the present invention as shown in FIGS. 7A and 7B.

DETAILED DESCRIPTION OF THE INVENTION

FIGS. 1 through 9, discussed below, and the various embodiments used to describe the principles of the present invention in this patent document, are by way of illustration only and should not be construed in any way to limit the scope of the invention. Those skilled in the art will understand that the principles of the present invention may be implemented in any suitably arranged system, as well as method of operating the same, for allocating a plurality of resources, both process and human resources, among a plurality of tasks within a process system.

Figure 1:
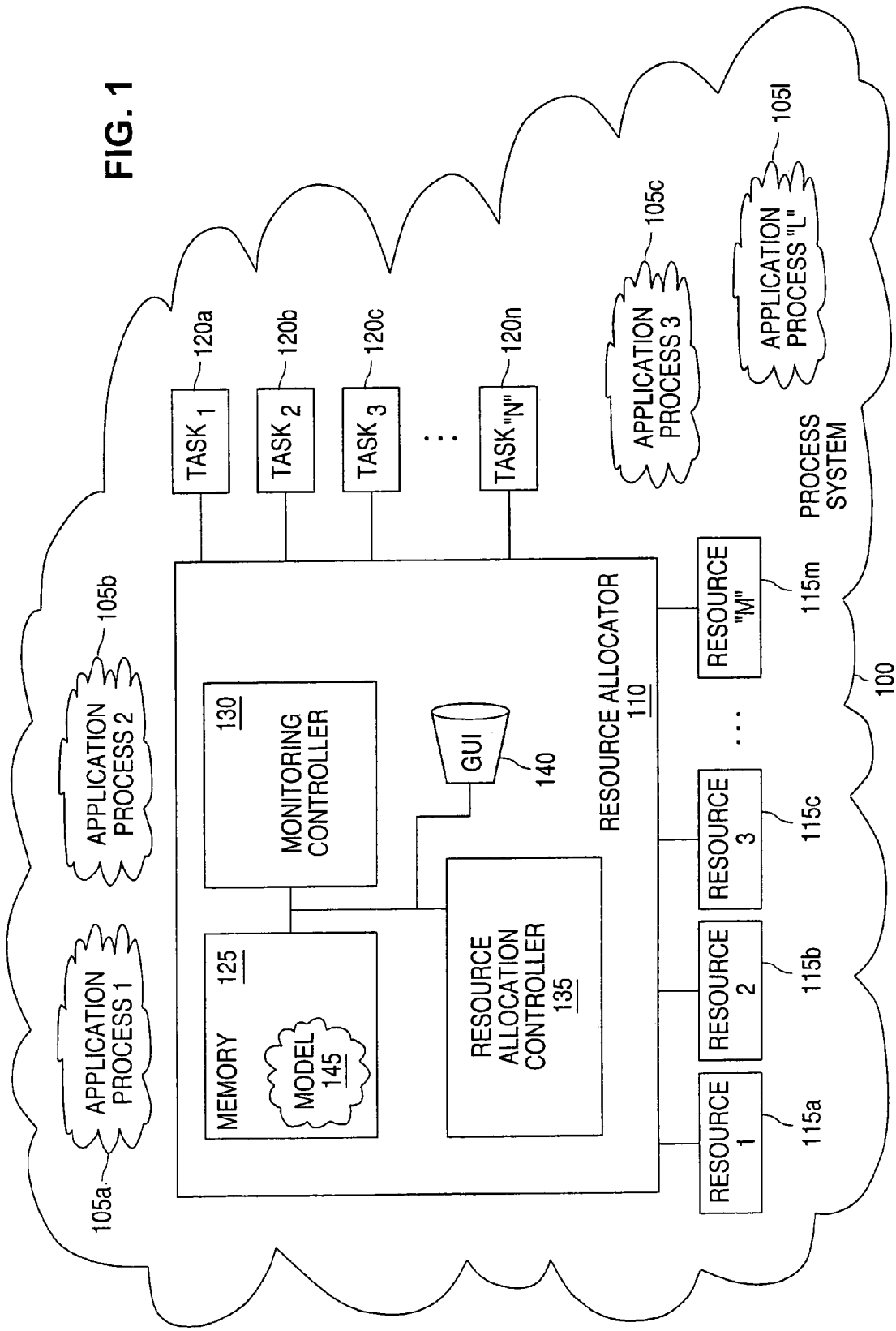
FIG. 1 illustrates an exemplary process system and associated resource allocator in accordance with the principles of the present invention.

Turning initially to FIG. 1, illustrated is an exemplary process system (generally designated 100), which includes a plurality of application processes 105. For purposes hereof, "application process" is defined broadly as a program or a part of a program that can execute, whether independently of other parts or not, and is designed for or to meet the needs of the process system 100. An application process may suitably consist of low-, mid- or high-level programs or parts thereof that interact with process system 100 that is associated with a resource allocator (generally designated 110), all in accordance with the principles of the present invention. For purposes hereof, the phrase "process system" means any computer processing system, network of computer processing systems, or portion thereof that is operable to monitor, control or otherwise supervise a process (e.g., information management system, manufacturing plant (e.g., semiconductor fabrication), refinery, hotel, restaurant, traffic control, transportation control, emergency services (e.g., police, fire, medical, military, etc.), and the like).

According to one advantageous embodiment hereof, process system 100 is a semiconductor fabrication facility that is operable to handle multiple and varied application processes, or plans, associated with complex multi-function resources (e.g., tools (including varying technologies)) and tasks to manufacture multiple and widely varying semiconductor products. System 100 may, in whole or in part, be a network-based, real-time, visualized, intelligent (i.e., self-learning) system, and include control enhancements for industries, whether manufacturing or otherwise, that require timely delivery of services, products or other resources. Such visualization may be over a time period of one or more years, months, days, hours, seconds, microseconds or other measurable time period.

Exemplary resource allocator 110 is operable to allocate a plurality of multi-function resources 115 among a plurality of tasks 120 within process system 100, wherein, for purposes of illustration, exemplary multi-function resources 115 may suitably be any tool, device or other system used in the manufacture process of semiconductor products. According to one advantageous embodiment hereof, resource allocator 110 is a general processor that is operable to accept variable service requests and to intelligently apply the required resource(s) to address such requests. Resource allocator 110 illustratively includes a memory 125, a monitoring controller 130, and a resource allocation controller 135. Resource allocator 110 is associated with a graphical user interface ("GUI") 140. GUI 140 provides graphical information controls (discussed with reference to FIGS. 2A and 2B) that cooperatively offer enhancements of real-time, visual, intelligent, and control functions, possibly through web-base connectivity.

Exemplary memory 125 is operable to store a model 145 of process system 100. Exemplary model 145 mathematically represents application processes 105, multi-function resources 115, and tasks 120, and also defines various relationships among related ones of application processes 105, multi-function resources 115, and tasks 120. According to one advantageous embodiment hereof, memory 125 includes a plurality of databases (shown in FIG. 3) used, for instance, for service/function, control and knowledge.

A service/function database may be operable to store information regarding customers, networks, transactions, resources, communications or the like. A control database may be operable to store algorithms, rules, key elements for decision-making or the like. A knowledge database may be operable to provide task related intelligent information to help make optimal decisions, and to acquire and accumulate experience through evaluating results (i.e., artificial intelligence, expert system analysis, neural networks, etc.).

Exemplary monitoring controller 130 is operable to monitor measurable characteristics associated with ones of application processes 105, multi-function resources 115, and tasks 120. According to one advantageous embodiment hereof, monitoring controller 130 is a real-time monitor of updated status or logistical data of resources and tasks, and enables human interaction online with other subsystems, allowing a human interface to respond to, modify, update or over-ride the automated decision-making processes. Each of the measurable characteristics is one of a status characteristic or a logistical characteristic.

Exemplary resource allocation controller 135 is responsive to ones of the monitored measurable characteristics and may be operable to: (i) operate the model; (ii) modify ones of the mathematical representations of application processes 105, multi-function resources 115, tasks 120, and the defined relationships among related ones of application processes 105, multi-function resources 115, and tasks 120; and (iii) allocate ones of resources 115 among ones of tasks 120 within process system 100.

According to one advantageous embodiment hereof, broadly, resource allocation controller 135 allocates ones of multi-function resources 115 among ones of tasks 120 within process system 100 in response to the monitored measurable characteristics to efficiently execute one or more application processes 105, and, more specifically, operates to interact with available resources and tasks to generate and manage the required transactions within one or more application processes 105 (noting, for instance, that measurable characteristics of resource allocation controller 135 may be associated with management of customers, networks, resources, and communications, such as service objectives, metrics, and measurements).

Exemplary GUI 140 is a user interface that is operable to transform real-time process system information into an audio or visual format to enable supervisory interaction. According to one advantageous embodiment hereof, GUI 140 is operable to visualize the data and status of resources, requests as well as on-going transactions by using graphic displays, multimedia equipment to provide real-time data as well as historical and statistical information with human interaction.

It is a primary object of the present invention to provide systems, as well as methods of operating the same, for delivering GUIs, particularly, compliance-monitoring viewers, for association with systems that allocate multi-function resources among a plurality of tasks, for instance, in semiconductor wafer fabrication. A compliance-monitoring viewer hereof enables management to measure plan effectiveness, for example, a plan used in the diffusion area where multi-function resources that have varying capabilities are used to produce product. The compliance-monitoring viewer, and related methodology, produce graphs, tables, summaries and the like at individual tool, tool operator, shift, or other levels to enable plan-compliance review, including over a sliding-time horizon.

Figure 2A:
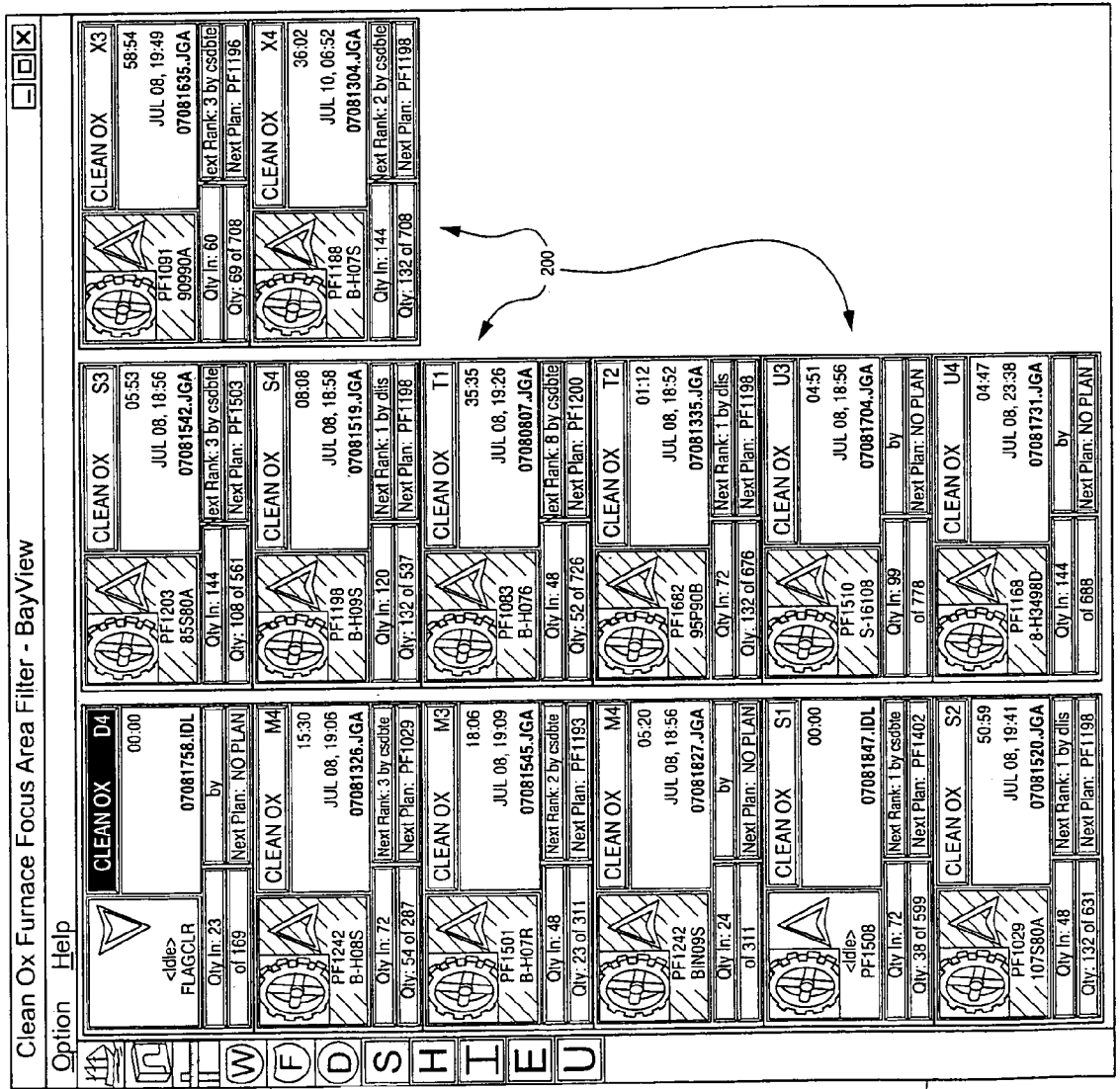
FIG. 2A illustrates a graphical user interface ("GUI") in accord with the principles of the present invention for use in a semiconductor wafer fabrication.

Turning to FIG. 2A illustrated is an exemplary GUI 140 in accord with the principles of the present invention for use in a semiconductor wafer fabrication. GUI 140 includes a plurality of icons 200 representing a plurality of multi-function resources 115. In wafer fabrication, the mission is to provide the shortest cycle time, highest quality, cost effective products on time to continually meet revenue growth plans. This causes an on-going need to continuously improve manufacturing processes including the content and methods of delivering information to an operations staff.

Status information about the manufacturing tools and work in process inventory are often critical to making decisions needed to successfully operate a wafer manufacturing line on a daily basis. In executing an application process, or plan, it is critical to know what is planned next. This is a time-consuming communication exercise. These plans may be flexible in responding to WIP mix, tool availability changes, associated work schedules and skill sets. A "just in time" environment is responsive to "queue jumping hot lots", or "Static WIP" as well as special work requests for certain portions of lots that make the planning process more difficult. Being able to project output by the "end of business" makes for its own special status requirements when attempting to measure turns and operational outputs.

Real-time information is preferred to updated batch reporting, and when combined with GUI 140 interface, operational staff productivity increases significantly. In one implementation, resource, or tool-level, status data is updated automatically every minute while the logistical information is updated every other minute. The exemplary running wheel icon is easily contrasted between "on" and "off" (or static) used to display an "idle" furnace making for quick interpretation.

According to this implementation, status data changes as the tool, itself progresses through process sub-steps, and is sensed from the sensors, timers, controllers (e.g., mass flow controllers, thermocouples, countdown buffers, etc.), etc. Status data may suitably be modified by one resource or tool at a time and changes in logistical data do not directly cause a change in status data. Logistical data is typically digital in nature and arguably comprehends conditions not residing on the resource or tool itself (e.g., number of lots, operator identification; plan state, etc.) The logistical data of a group of resources or tools may change based on a status change of any one resource or tool, a task, an application process, a lot of material, or the like.

Many resources, such as furnaces, for example, can be sub-divided into smaller logical workgroups arrangements or into process focus area groups (e.g., clean oxidation). An exemplary display for each tube's information is a combination of tool and logistical level data in a standardized format that includes:

tool name, tool focus area assignment, idle or running, up or down, ownership (e.g., Prod, Eng, Mnt), process running including the sub-routine level, time remaining, time of completion, number of wafers in process, number of wafers available to process, number of wafers in next application process (or plan), next process planned, originator of next application process, rank of next application process in relation to dispatching system.

Figure 2B:
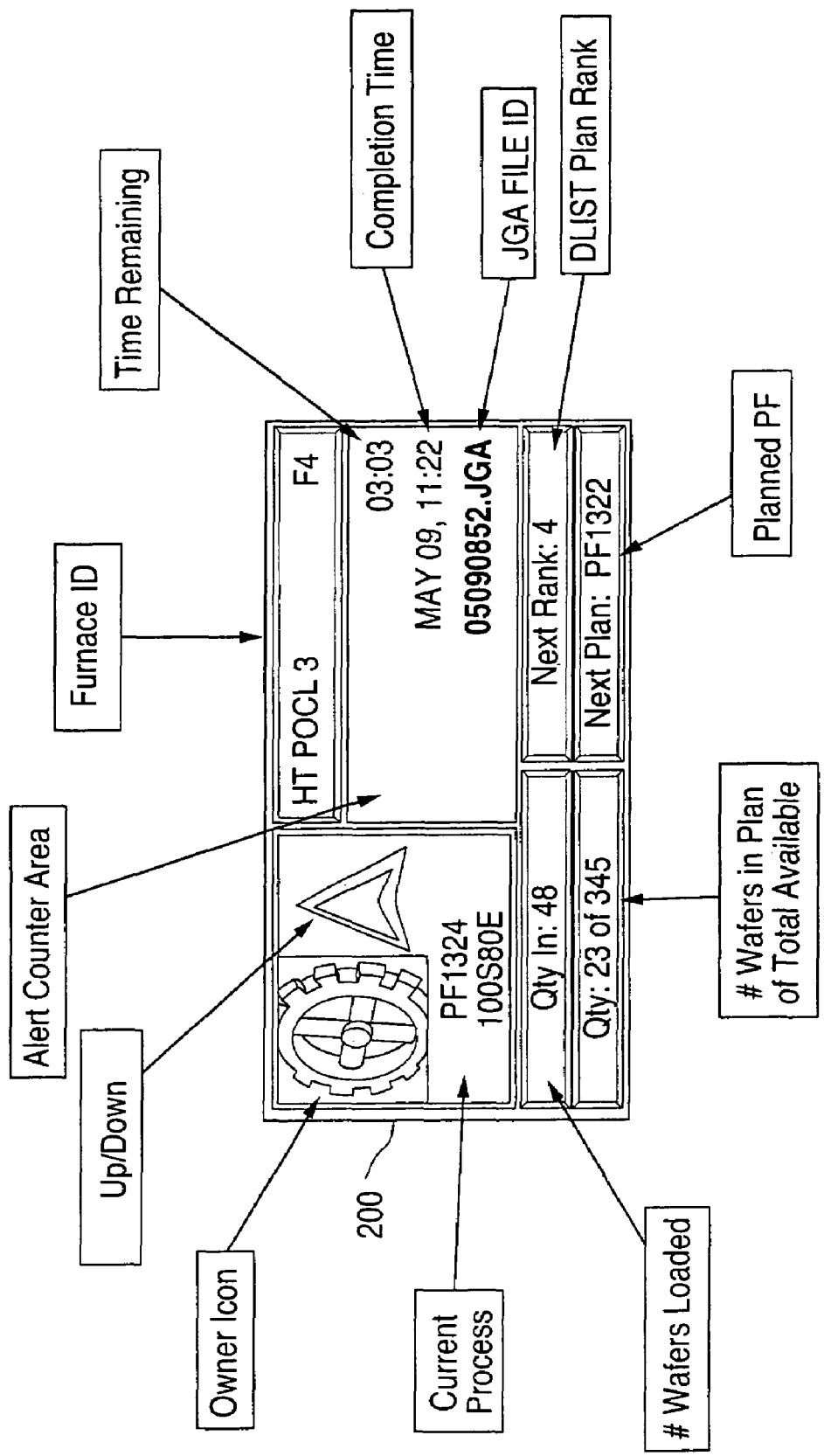
FIG. 2B illustrates an icon from the GUI of FIG. 2A that represents one of a plurality of multi-function resources in accord with the principles of the present invention for use in a semiconductor wafer fabrication.

Turning to FIG. 2B, illustrated is an exemplary icon that represents one of a plurality of multi-function resources 115 in accord with the principles of the present invention for use in a semiconductor wafer fabrication. Additional features include special symbols that appear if the tool develops an equipment error condition, as this may cause a need for a modification of a loading plan, as an example. Buttons enable queries of the factory logistical data including qualification schedules, last "X" hour history, whole area WIP (e.g., running, ready to load, ready to pre-clean, etc.), application processes for other tools including the unload schedules for work currently in process. Button bars may also include launch points for viewing either the current run data itself or in combination with historical runs of this or any other furnace, according to this example.

Figure 3:
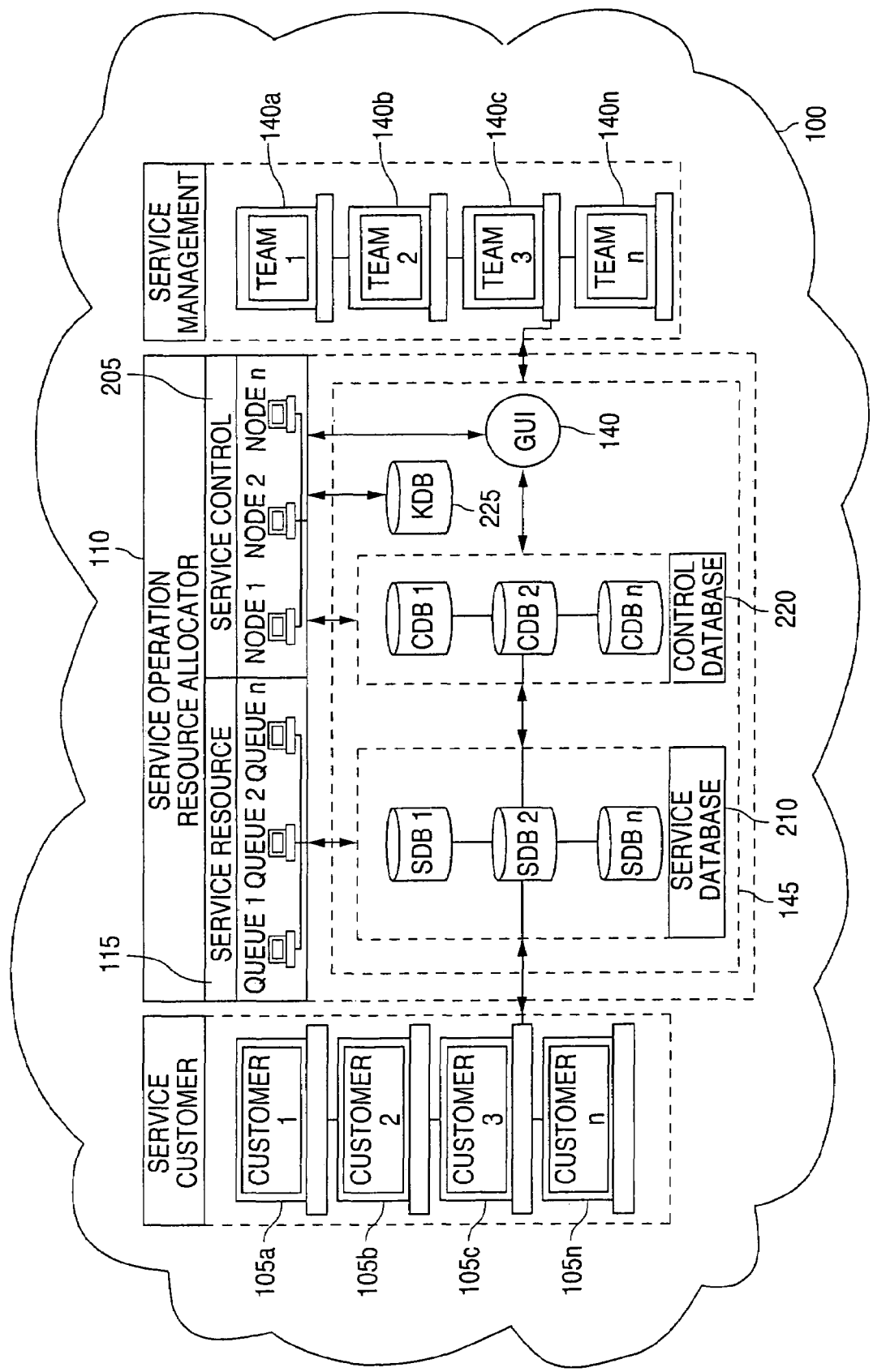
FIG. 3 illustrates a block diagram of a process system implemented as an information management system associated with the resource allocator of FIG. 1, all in accordance with the principles of the present invention.
Figure 4:
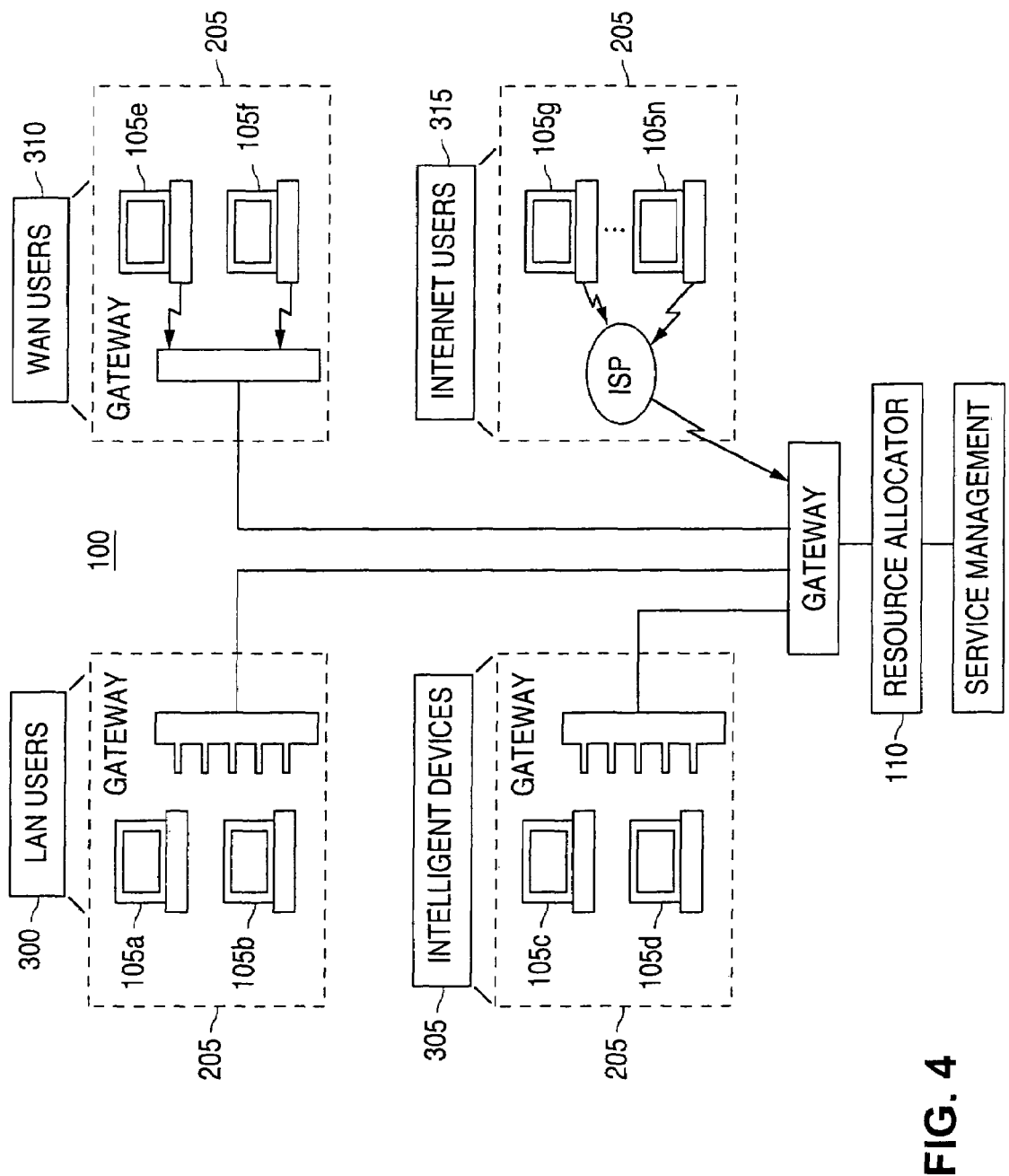
FIG. 4 illustrates a block diagram of a network infrastructure utilized to implement a distributed embodiment of the process system of FIGS. 1 and 3 in association with a centralized implementation of resource allocator, all in accordance with the principles of the present invention.

Turning next to FIGS. 3 and 4, introduced is an information management system embodiment of process system 100 of FIG. 1. The exemplary information management system embodiment of process system 100 is introduced by way of illustration only to describe the principles of the present invention and should not be construed in any way to limit the scope of the invention. Illustrated is a conceptual block diagram of process system 100 associated with a service operation resource allocator 110, all in accordance with the principles of the present invention. Exemplary process system 100, in addition to service operation resource allocator 110, also includes a plurality of application processes 105, namely, a service customer block, and a service management block.

Exemplary service customer block may be a person or a controller; for instance, service customer block may suitably be a person using a computer that is associated with an intranet or the Internet, or it may be an intelligent input/output device associated with equipment to send and receive data using connectivity.

Exemplary service management block includes a plurality of GUIs 140 that provide user interfaces operable to transform real-time information into an audio or visual format to enable supervisory interaction. Service management block is operable to enable supervisory interaction with flexibility to visualize and control the entire service process flexibly (in a related embodiment, such supervisory interaction may suitably be in detail or in general with zoom in/out functions in a real-time mode).

Exemplary resource allocator 110 is a resource allocator that is operable to allocate a plurality of service resources 115 among a plurality of tasks 120 within process system 100. Service resources 115 include multifunction resources, which may include definitions of human resources based upon services, functions, activities, skills, qualifications, task preferences, track records and the like. Exemplary human resources may include service staff that work with customers or service requests, such as waiters, mechanics, plumbers, painters, electricians, soldiers, technicians, engineers, etc. Exemplary human resources may also include service coordinators, system operators and administrators that support the operations, such as accountants, purchase agents, auditors, receptionists, secretaries, controllers, servicemen, network administrators, etc. Exemplary human resources may also include service managers, system managers, and operation managers that manage the process system and make business and operations decisions, such as information technology ("IT") managers, police chiefs, hotel managers, restaurant managers, store managers, officers, executives, etc.

The process resources may suitably be classified into eight categories, namely, tools, hardware, software, databases, communication/connectivity resources, transportation resources, facilities, utilities, and inventories. Exemplary hardware resources include computers, network devices such as switches/routers/hubs, digital/analog sensors, cables, meters, monitors, scopes, audio/video devices, special service tools, etc. Exemplary software resources include operation systems, network systems, database systems, application programs, graphics interfaces, system utilities, special applications such as artificial intelligence, neural net, system control and data acquisition, etc.

Exemplary data resources include three databases, namely, (i) service databases 210 that maintain service objects (customers/equipment), service transactions, networks, resources, and communications, (ii) control databases 220 that maintain key attributes, algorithms, instructions, mathematics and rules that manage, monitor and control the operations, and (iii) knowledge databases 225 that maintain on-going real-time knowledge, information and experiences compiling for resource retention and self-learning process.

Exemplary communication/connectivity resources include local-area and wide-area networks, Internet, telephones/facsimile, mail, etc. Exemplary transportation resources include trucks, cars, boats, airplanes, bikes, motorcycles, railroads, space shuttles, balloons, military vehicles, all-terrain vehicles, satellites, etc. Exemplary technology resources include service automation technology that combines major technology areas, namely, (i) network technologies in office automation, (ii) human machine interface ("HMI") technologies in industrial automation, and (iii) artificial intelligent technologies. Exemplary facilities resources include computer control/monitor/server rooms, labs, workrooms, offices, towers/antenna, machines/tools, piping, etc. Exemplary utilities resources include electricity, water, fuel, air, chemicals, automated warehousing, distribution systems/gathering systems, etc. Exemplary inventory resources include supplies, materials, peripherals, components, ammunition, etc.

An important aspect of the illustrated embodiment is that resource allocator 110 provides systematic operation with automatic and responsive control of service activities based on real-time service data and built-in intelligent decisions from model 145 of FIG. 1. Routine decisions are made by service automation while service operations are ongoing. The management is able, via GUIs 140, to make responsive decisions and allocate or utilize service intelligently based on the real-time graphics-enhanced information.

Again, a primary object of the present invention is providing systems, and related methodologies, for delivering compliance-monitoring viewers for association with systems that allocate resources among a plurality of tasks. A compliance-monitoring viewer hereof enables management to measure service plan effectiveness, for example, a plan used in the provision of services as described here above where multi-function service resources having varying capabilities are used to provide services. Compliance-monitoring viewers, and related methods, produce graphs, tables, summaries and the like at individual service resources, resource providers, shifts, or other monitoring levels to enable service-plan-compliance review, including over a sliding-time horizon.

Resource allocator 110 is illustratively associated with a plurality of service resources 115 and a plurality of service controls 205. Exemplary service resources 115 may suitably include tools, hardware, software, information or facilities, all of which are to be applied to service activities. Exemplary service controls 205 may suitably include monitoring controller 130, resource allocation controller 135, and model 145, all of FIG. 1, that work cooperatively to automatically issue service instructions according to defined rules of model 145.

Service control 205 therefore monitors and controls the service resource allocation and utilization as well as service level and matrix for the service operation. Model 145 of service control 205 again mathematically represents application processes 105, service resources 115, and tasks 120, and also defines various relationships among related ones of the same, and includes a service database 210, a control database 220 and knowledge database 225. Any suitably arranged mathematical representation may be used for model 145 or, for that matter, any of the measurable characteristics. Those skilled in the art will readily recognize that such mathematical representations will often be application dependent. Such measurable characteristics may be either status characteristics or logistical characteristics, and are used to execute model 145 to efficiently allocate resources.

Exemplary service database 210 is operable to store real-time information regarding service customers 105 and service activities. Service database 210 provides information of service activities to service resources 115 through a plurality of service queues. Service database 210 also feeds real-time information to control database 220. According to the present embodiment, service database 210 may suitably be a relational database with flat file structure containing data in a two-dimensional table format. Exemplary control database 220 is operable to store consolidated real-time key attributes of information from service database 210 and also stores pre-defined algorithms (instructions and rules associated with monitoring controller 130 and resource allocation controller 135). Instructions can be automatically executed according to the rules and real-time key attributes. Service control 205 works with control database 220 to carry out defined instructions. According to the present embodiment, control database 220 is a data file with special format that contains key data and algorithms (instructions and rules associated with monitoring controller 130 and resource allocation controller 135).

Exemplary knowledge database 225 is operable as a central repository of qualitative and quantitative information to develop standards of performance in activities that are common regardless of industry. Knowledge data that would serve as a reference point for performance and procedural improvement to provide task related intelligent information used to make decisions optimally, and to acquire and accumulate experience through evaluating results (i.e., artificial intelligence, expert system analysis, neural networks, etc.).

An important aspect of the illustrated embodiment is that control database 220 serves to provide information service management with multimedia, and control enhancements based on real-time information. In summary, using service database 210, control database 220 and knowledge database 225, resource allocator 110 is operable to allocate a plurality of multifunction service resources 115 among a plurality of tasks 120 within process system 100.

Turning now to FIG. 4, illustrated is a conceptual block diagram of an exemplary network infrastructure utilized to implement a distributed embodiment of process system 100 in association with a centralized implementation of service operation resource allocator 110. Exemplary distributed process system 100 includes a plurality of application processes 105, including LAN users 300, intelligent devices 305 (e.g., personal data assistants ("PDAs"), two-way messaging devices, etc.), WAN users 310, Internet users 315, and the like. Those of ordinary skill in the art will recognize that this embodiment and other functionally equivalent embodiments may suitably be implemented by a variety of methods using many different computer, or processing, system platforms. Conventional computer and processing system architecture is more fully discussed in *Computer Organization and Architecture*, by William Stallings, Mac-Millan Publishing Co. ($3^{rd}$ ed. 1993); conventional processing system network design is more fully discussed in *Data Network Design*, by Darren L. Spohn, McGraw-Hill, Inc. (1993); and conventional data communications is more fully discussed in Data *Communications Principles*, by R. D. Gitlin, J. F. Hayes and S. B. Weinstein, Plenum Press (1992) and in *The Irwin Handbook of Telecommunications*, by James Harry Green, Irwin Professional Publishing ($2^{nd}$ ed. 1992). Each of the foregoing publications is incorporated herein by reference for all purposes.

Broadly, process system 100 allocates a plurality of multifunction resources among a plurality of tasks thereby enabling real-time process automation through mathematical modeling of the process resources 115 and tasks 120, and then allocating ones of such resources 115 to perform various tasks 120 within the process system 100. For the purposes of the illustrated embodiment of FIG. 4, tasks are divided into three categories, namely, service requests, service dispatches and information sharing. A service request may suitably be stored in service databases 210 with priority, location, contents, requirements, contacts, etc. A service dispatch may suitably be stored in control databases 220 and knowledge databases 225 with service level objectives, service metrics/measurements, transaction/actions, status and situations, decision-making processes with real-time responsive, pre-defined, programmed, intelligent, knowledge/experience retention and self-learning characters. Information sharing is a request for computer generated audio/video and print report, e-based, real-time, graphical/visualized, etc.

Figure 5:
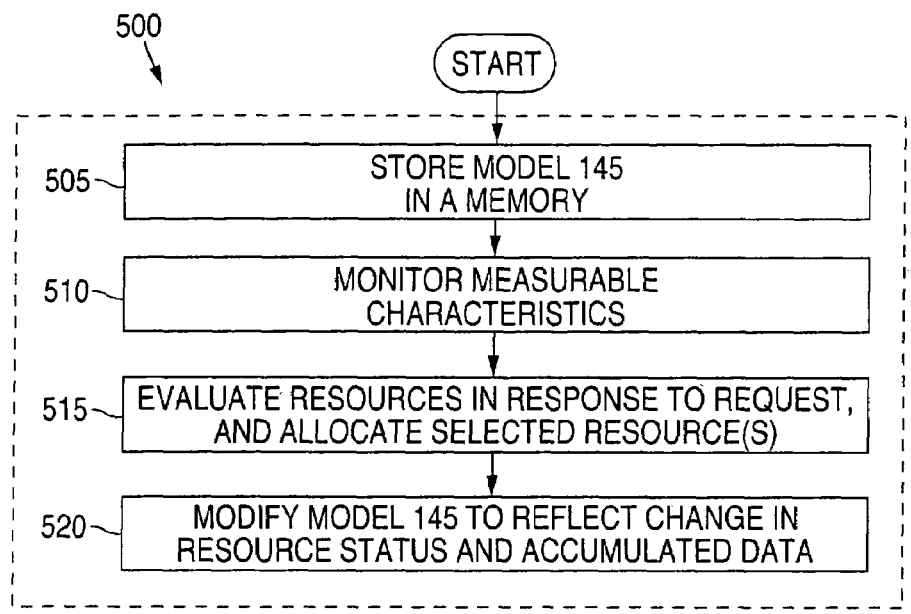
FIG. 5 illustrates a flow diagram of an exemplary method of operating the process system of FIGS. 1 to 4 in accordance with the principles of the present invention.

Turning next to FIG. 5, illustrated is a flow diagram (generally designated 500) of an exemplary method of operating process system 100 of FIGS. 1 to 4, all in accord with the principles of the present invention. For purposes of illustration, concurrent reference is made to embodiment disclosed with reference to FIG. 1. It is beneficial to assume that process system 100 is instantiated and fully operational, and for illustrative purposes directed to a raw material refining environment. Further, for simplicity, assume that there are a plethora of multi-function resources, including human resources. Thus, exemplary process system 100 controls processing raw materials, and likely controls a control center and associated process stages (not shown; e.g., application processes 105).

A first resource 115 might include raw material grinders that receive a feed of raw material and grind the same, such as by using a pulverizer or a grinding wheel, into smaller particles of raw material. A second resource 115 might include a washer that receives the ground raw materials and cleans the same to remove residue from the first stage. A third resource 115 might include separators that receive the ground, washed raw materials and separate the same into desired minerals and any remaining raw materials. Since this process system and related facility are provided for purposes of illustration only and the principles of such a facility are well known, further discussion of the same is beyond the scope of this patent document and unnecessary.

To begin, resource allocator 110 stores a model 145 of process system 100 in memory (process step 505). Model 145 mathematically represents multifunction resources 115, the process resources, the application processes 105 (i.e., the control for the grinders, separators and washers, etc.), and relationships among related ones thereof. Resource allocator 110 then monitors these measurable characteristics and receives service requests (process step 510), and, for the present example, from a particular grinder. The measurable characteristics may be status or logistical.

In response to measurable characteristics causing a request for service of the subject grinder, resource allocator 110 evaluates the alternate resources available and allocates one to provide the same function, along with process resources that may be necessary and appropriate to complete the same (process step 515). Resource allocator 110, in response to the servicing of the task, modifies ones of the mathematical representations, first indicating that the resource is occupied and possibly indicating the quality with which the task was completed (process step 520).

According to the illustrated embodiment, resource allocator 110 modifies knowledge database 225 to provide updated task related information to help make future decisions concerning the grinder, the allocated alternative grinder, and possibly any human resource used to service the same, etc., both intelligently and optimally. Resource allocator 110 thereby acquires and accumulates experience through evaluating results (i.e., artificial intelligence, expert system analysis, neural network analysis, etc.). Thus, in a later scenario, should this same multifunction resource 115 be otherwise occupied with another task and this grinder requires a similar service, resource allocator 110 can suitably utilize dynamic knowledge database 225 evaluate available resources 115 to decide whether to reallocate this same grinder resource 115 to the task based upon past experience recorded in the associated measurable characteristics or to allocate another resource to the task left uncompleted. Again, multifunction resources, both process and human, are re-usable, re-directable for "next" requests through intelligent decision making sub-process of experience accumulation, analysis, optimization and self-learning. Knowledge database 225 operates as a central repository of knowledge data, capturing qualitative and quantitative information to develop standards of performance in activities that are common regardless of industry.

According to this embodiment, a compliance-monitoring viewer (shown with reference to FIGS. 7A, 7B and 9) may suitably be associated with system 100 to enable management to measure facility effectiveness, for example, a plan used in the grinding area where multi-function resources are used. The compliance-monitoring viewer may produce graphs, tables, summaries and the like at individual tool, tool operator, shift, or other levels to enable plan-compliance review, including over a sliding-time horizon.

Figure 6:
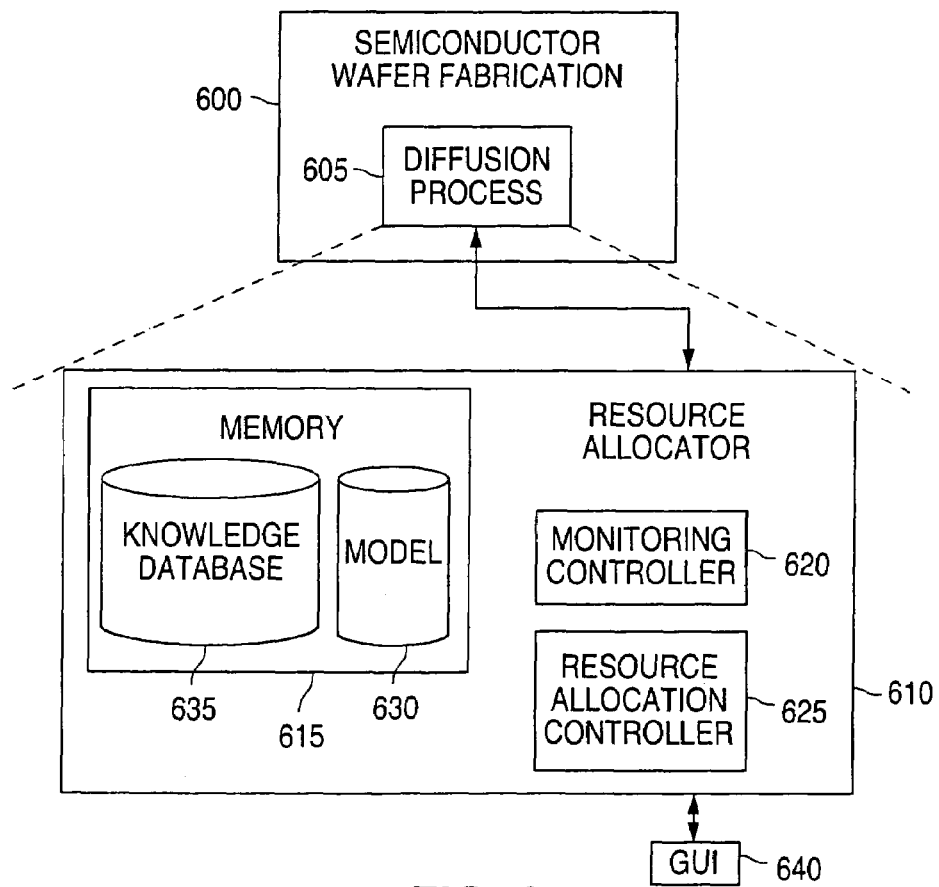
FIG. 6 illustrates a conceptual block diagram of an exemplary embodiment of a resource allocator for use in a diffusion process in semiconductor wafer fabrication according to one embodiment of the present invention.

Turning to FIG. 6, illustrated is a conceptual block diagram of an exemplary embodiment of a resource allocator 610 for use in a diffusion process 605 in semiconductor wafer fabrication 600. The diffusion processes in semiconductor wafer fabrication are well known and, for the purposes hereof, may again be described as a process of depositing a dopant material onto a silicone substrate and diffusing the dopant material into the silicone substrate via thermal agitation.

According to the illustrated embodiment, diffusion process 605 is operable to execute a plurality of diffusion process plans. Resource allocator 610 operates to allocate a plurality of multi-function resources or tools among a plurality of tasks of any given diffusion process plan. Resource allocator 610 comprises a monitoring controller 620, resource allocation controller 625, a model 630, and a graphical user interface 640.

Exemplary monitoring controller 620 monitors measurable characteristics associated with an executing diffusion process plan, the multi-function resources, and the related tasks. Each of the measurable characteristics is one of a status characteristic or a logistical characteristic. Exemplary model 630 is of diffusion process 605, and represents mathematically the plurality of multi-function resources and the plurality of tasks, as well as defines relationships among related ones thereof as a function of the diffusion process plans.

Exemplary resource allocation controller 625 operates the diffusion process model 630 in response to the monitored measurable characteristics and allocates certain of the multi-function resources among certain of the tasks to efficiently execute the diffusion process plan. Resource allocation controller 625 is therefore operable to select and reselect allocated ones of the multi-function resources among ones of the tasks in response to the monitored measurable characteristics.

During the diffusion process, meaning before, during and between execution of various diffusion process plans, resource allocation controller 625 operates to modify ones of the mathematical representations in response to the status or logistical characteristic data.

The illustrated resource allocator 610 also comprises a data repository, or memory 615, having at least a knowledge database 635. Resource allocator 610 further operates to modify knowledge database 635 in response to changes to or the condition/value of the status and logistical characteristic data to thereby enable the resource allocator to be self-learning.

In operation, resource allocator 610 allocates the multi-function resources among the tasks within diffusion process 605 that executes one or more diffusion process plans. Initially, and continuously, monitoring controller 620 monitors measurable characteristics that are associated with an at least one executing diffusion process plan, the multi-function resources, and the tasks. Each of the measurable characteristics is either status a characteristic or a logistical characteristic.

The illustrated embodiment delivers compliance-monitoring viewers (shown in FIG. 6 as GUI 640) to enable management to measure diffusion plan effectiveness. Compliance-monitoring viewers produce graphs, tables, summaries and the like at individual tool, tool operator, shift, or other levels to enable plan-compliance review, including over a sliding-time horizon.

Model 630 of diffusion process 605 is instantiated to mathematically represent the multi-function resources and tasks of diffusion process 605, and to define relationships among related ones thereof as a function of the at least one diffusion process plan.

Resource allocation controller 625 operates model 630 in response to the monitored measurable characteristics, and allocates ones of the multi-function resources among ones of the tasks within diffusion process 605 to efficiently execute at least one diffusion process plan.

Figure 7A:
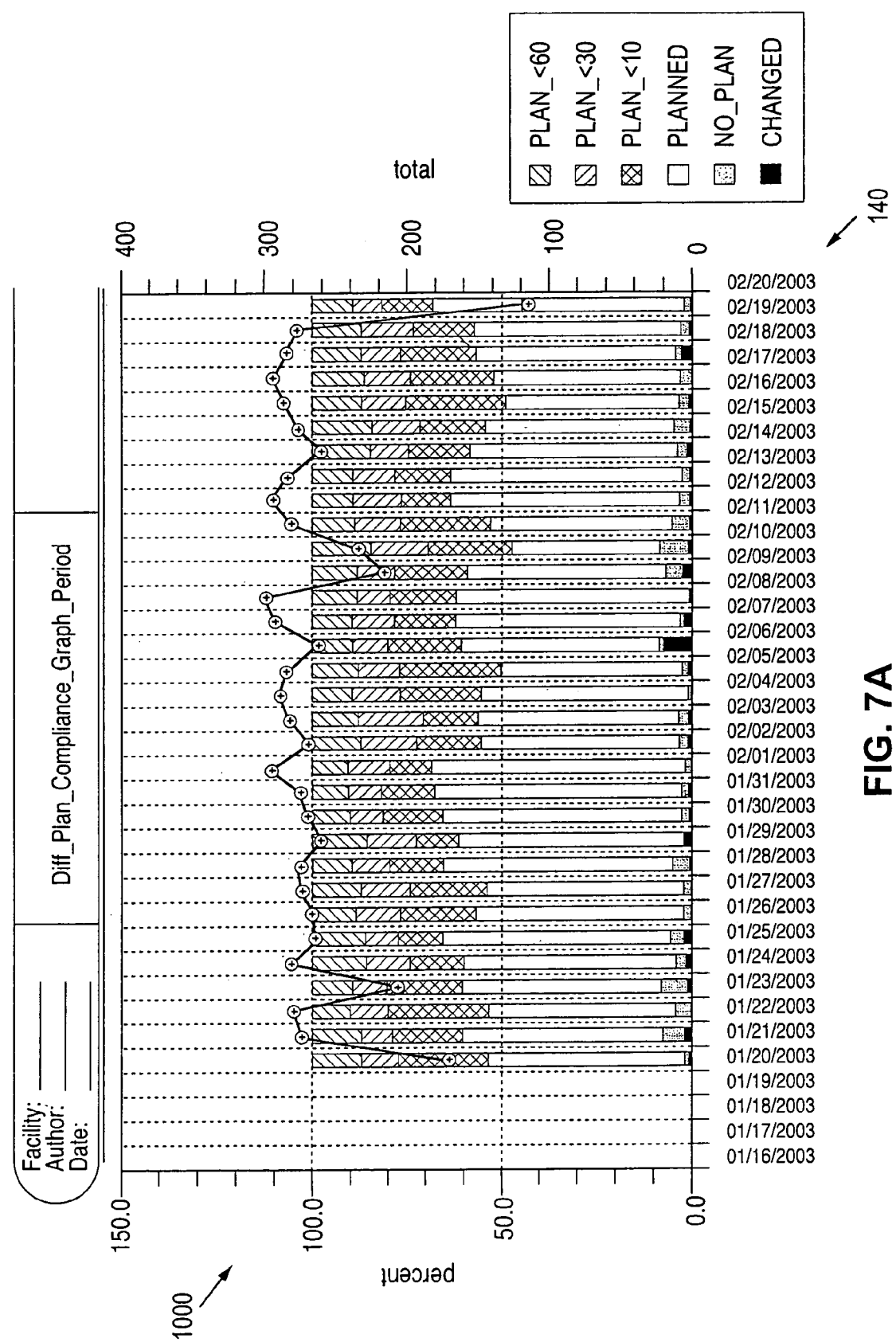
FIG. 7A illustrates an exemplary graphical display of information provided by a compliance-monitoring viewer of the present invention illustratively associated with a resource allocator in semiconductor wafer fabrication.

Turning to FIG. 7A, illustrated is an exemplary graphical display of information (generally designated 1000) provided by a compliance-monitoring viewer of the present invention that may illustratively be associated with resource allocator 110 in a semiconductor wafer fabrication facility.

An exemplary compliance-monitoring viewer is implemented in software and operates to generate an interface that provides graphical information that cooperatively offers enhancements of real-time, visual, intelligent, and control functions, possibly through web-base connectivity. Stated differently, a compliance-monitoring viewer is an interface that is operable to transform real-time process system information into an audio or visual format to enable supervisory interaction. Via a compliance-monitoring viewer, management operates to measure plan effectiveness, for example, a plan used in the diffusion area of the present example where multi-function resources have varying capabilities and are used to produce wafer products.

An exemplary compliance-monitoring viewer uses a combination bar/line graph to enable plan-compliance review. An exemplary bar/line graph demonstrates the compliance to plan over the time period of Jan. 20, 2003 to Feb. 20, 2003. Each bar may suitably be shaded, color-coded or the like based on the percentage of loads (the line) that fall into each category (changed, no plan, planned, "plan<10", "plan<30" and "plan<60").

Ideally, diffusion plans are defined well in advance of a load (e.g., thirty, sixty, one hundred and twenty minutes in advance). In reality, semiconductor-fabrication dynamics cause ever-changing requirements that often push the edge of resource capability. Diffusion plans that change at the "last minute" represent opportunity for improvement in the smooth running of a semiconductor-fabrication operation. Actual operation without a diffusion plan indicates that desired area-to-area communication is compromised (e.g., furnace to wet deck). Further, diffusion plans having relatively short durations, such as, less than ten minutes, represent an opportunity for better work area organization and communication. By sub-dividing the bars production-line management may suitably address the issues over time incrementally.

Figure 7B:
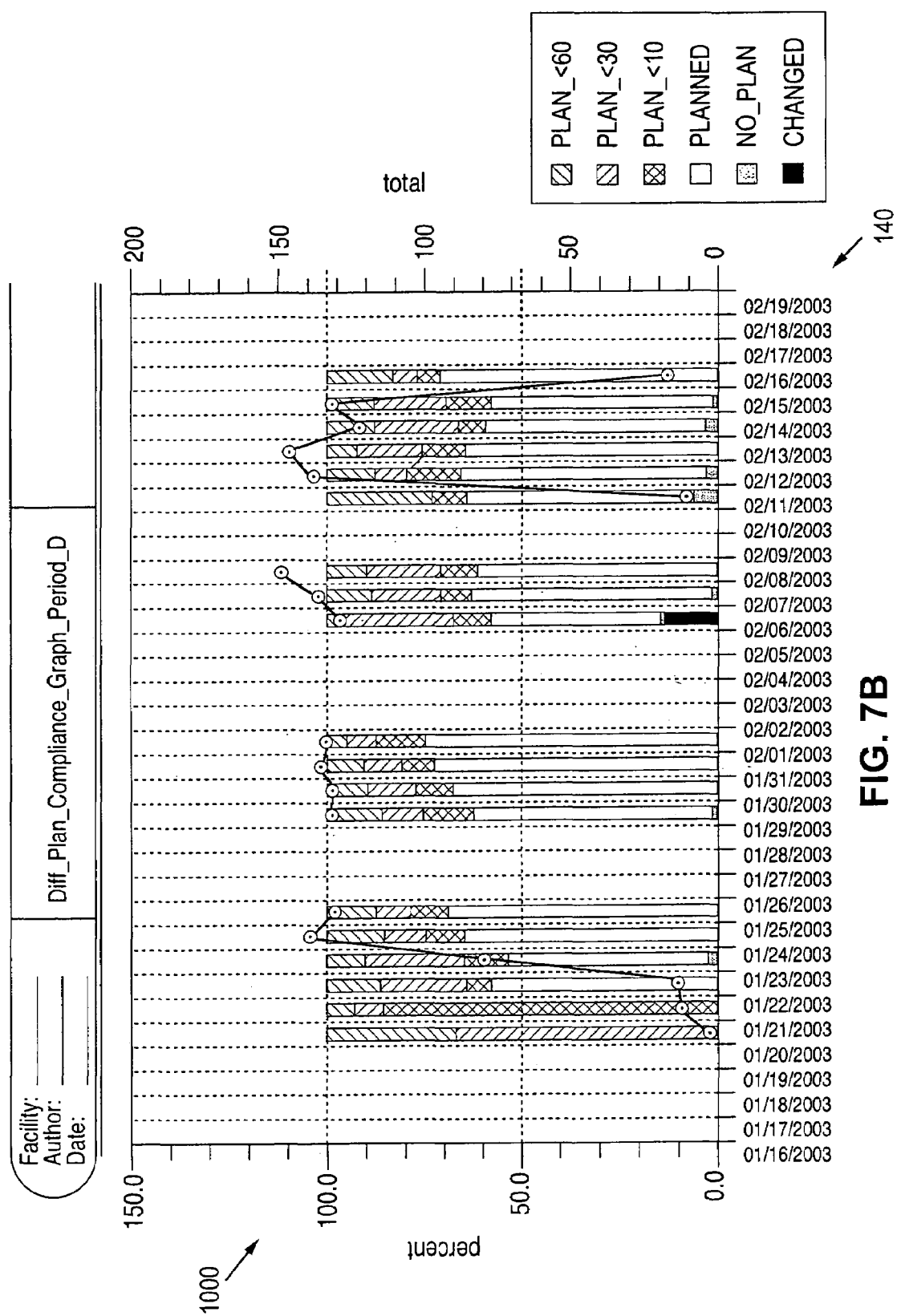
FIG. 7B illustrates an exemplary graphical display of a subset of information provided by the compliance-monitoring viewer of the present invention as shown in FIG. 7A.

Turning to FIG. 7B, illustrated is an exemplary graphical display of a subset of information (generally designated 1000) provided by the compliance-monitoring viewer of the present invention as shown in FIG. 7A that may illustratively be associated with resource allocator 110 in a semiconductor wafer fabrication facility.

An exemplary compliance-monitoring viewer displays in FIG. 7B a selected subset of days that was related to a first of a plurality of the manufacturing shifts. This level of detail illustratively allows shift performance to be managed uniquely by shift-level supervision, including, for instance, when individuals are working additional shifts on normally unscheduled days, or a sliding-time horizon.

In this implementation, an "owning" supervisor may monitor the planning performance of individuals or automated systems to the original shift. Unexpected events, such as a power outage, may increase "changed plans" as the manufacturing line responds to disruption—conversely, manufacturing "smoothness" or planning correlates to efficient output of high quality product.

Turning to FIG. 8, illustrated is an exemplary display of information (generally designated 1000) provided by an EXCEL spreadsheet that is associated with compliance-monitoring viewers of the present invention as shown in FIGS. 7A and 7B. The display 1000 is presented in a modifiable table in EXCEL format wherein the display shows (i) each instant in time when a load is initiated (Column C), (ii) a level of detail sufficient to allow traceablity (Column H; a query may produce a compliance metric based on the relationship of a diffusion plan at that time), and (iii) a composite level of detail provided using filters for shift assignment (Column G).

Figure 9:
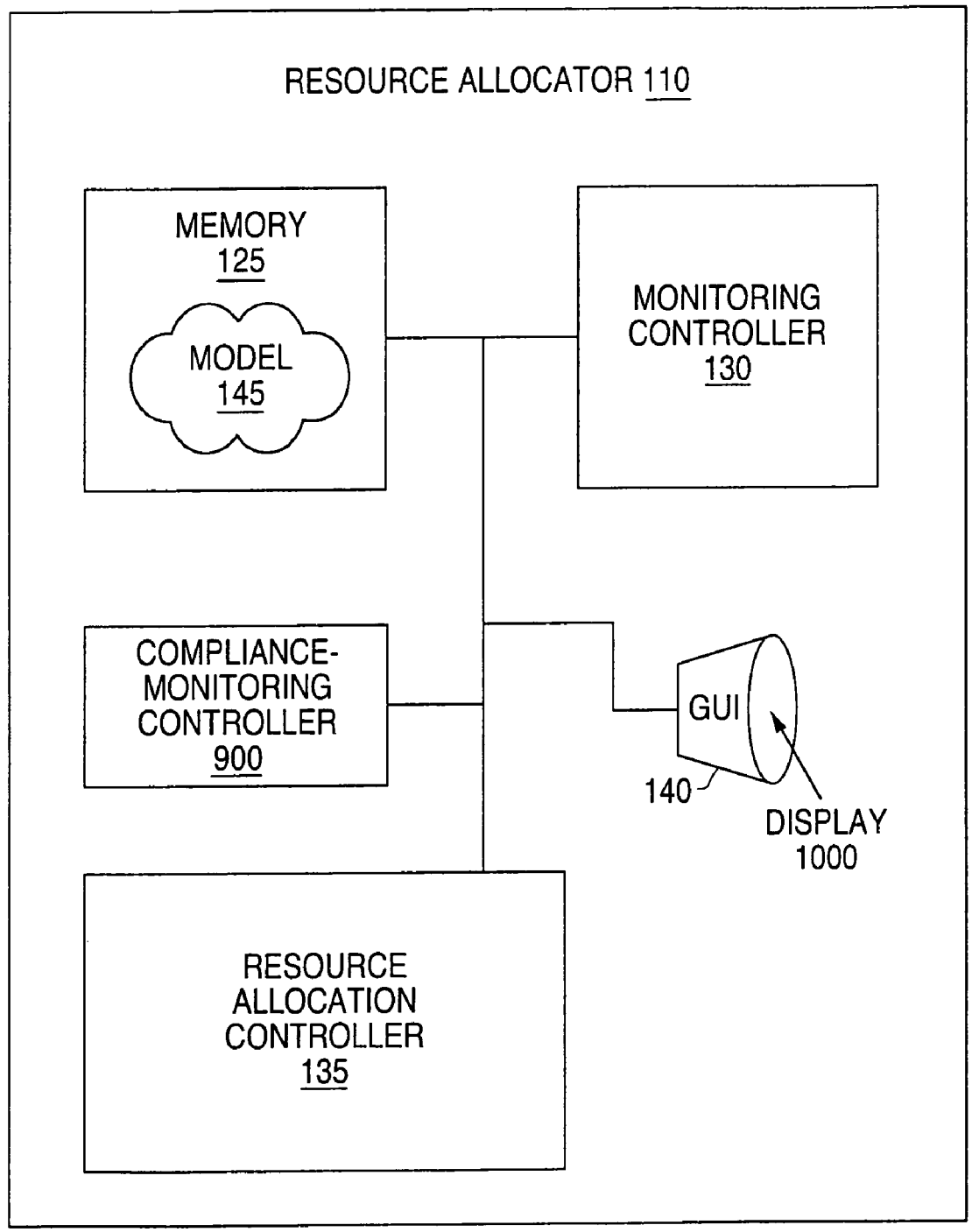
FIG. 9 illustrates an exemplary resource allocator associated with the compliance-monitoring viewer of FIGS. 7A and 7B in accordance with the principles of the present invention.

Turning to FIG. 9, illustrated is an exemplary resource allocator 110 with the compliance-monitoring viewer of FIGS. 7A and 7B, all in accordance with the principles of the present invention. An exemplary display 1000 of information is provided by the compliance-monitoring viewer, which may be displayed on any type of display device (e.g., GUI 140, GUI 640, etc.). The display 1000 comprises a plurality of columns and a plurality of rows as above discussed.

For purposes of illustration, concurrent reference is made to the respective embodiments disclosed with reference to FIGS. 1, 6, 7A, 7B and 8. It is beneficial to assume that process system 100 is instantiated and fully operational, and for illustrative purposes directed to a semiconductor wafer fabrication environment.

An exemplary compliance-monitoring viewer is implemented in software and operates to generate an interface that provides graphical information controls that cooperatively offer enhancements of real-time, visual, intelligent, and control functions, possibly through web-base connectivity. According to one advantageous embodiment hereof, a compliance-monitoring viewer is operable to visualize diffusion plan compliance with data and the status of multifunction resources, service requests, as well as on-going transactions by using graphic displays, multimedia equipment, as well as historical and statistical information with management (whether human management, automated management, or some combination of the two) to track and display compliance-monitoring. According to the illustrated embodiment, real-time information is preferred to updated batch reporting, and when combined with GUI 140 interface, operational staff productivity increases significantly.

Through mathematical modeling of multi-function process resources and allocating ones of such resources to perform various tasks within the process system, a resource allocator 110 is introduced that allocates such resources among a plurality of tasks within process system 100 to executing the at least one application process or plan. Resource allocator 110 comprises a monitoring controller, a model of the process system, a resource allocation controller, and an exemplary compliance-monitoring controller 900 (associated with resource allocator 110, though in alternate embodiments, may be associated with the system in any suitable manner).

Exemplary monitoring controller 130 monitors measurable characteristics associated with the executing application process plan, multi-function resources and related tasks, each of the measurable characteristics being one of a status characteristic and a logistical characteristic. Exemplary model 145 represents mathematically the multi-function resources and the tasks, and defines relationships among related ones thereof as a function of the application process plan. Exemplary resource allocation controller 135 operates model 145 in response to the monitored measurable characteristics and allocates ones of the multi-function resources among ones of the tasks within the process system to efficiently execute the at least one application process. An exemplary compliance-monitoring viewer illustratively operates to transform real-time process system information into a multimedia format to enable supervisory interaction—human management, system management, or some suitable combination of human management and system management.

A compliance-monitoring viewer provides means to measure plan effectiveness. For instance, a plan used in the illustrative diffusion area where multi-function resources have varying capabilities and are used to produce semiconductor wafers, the compliance-monitoring viewer, and its related methodology, produce graphs, tables, summaries and the like at individual tool, tool operator, shift, or other levels to enable plan-compliance review, including over a sliding-time horizon.

Although the present invention has been described in detail, those skilled in the art should understand that they can make various changes, substitutions and alterations herein without departing from the spirit and scope of the invention in its broadest form.

What is claimed is:

1. An apparatus, comprising:
   a model mathematically representing a plurality of resources and a plurality of tasks associated with a process system, the model also defining relationships involving the resources and the tasks;
   a resource allocation controller capable of using the model to allocate one or more of the resources among one or more of the tasks based on one or more measurable characteristics associated with the process system, the allocation of the one or more resources among the one or more tasks supporting execution of at least one process plan; and
   a compliance-monitoring viewer capable of displaying process system information to a user, the process system information identifying real-time actual compliance to the at least one process plan during execution of the at least one process plan;
   wherein tasks that have been performed as part of the execution of the at least one process plan comprise diffusion plans associated with a semiconductor facility, wherein at least some diffusion plans are defined and then performed, and wherein a time period exists between the definition of at least one diffusion plan and the performance of that diffusion plan; and
   wherein the compliance-monitoring viewer is configured to provide a bar graph to present at least a portion of the process system information to the user, the bar graph comprising a plurality of bars, at least one of the bars subdivided into multiple sections, the sections associated with different lengths of the time periods between the definitions of the diffusion plans and the performance of the diffusion plans.

2. The apparatus of claim 1, wherein the compliance-monitoring viewer is associated with a graphical user interface.

3. The apparatus of claim 1, wherein the compliance-monitoring viewer is capable of visualizing the process system information over a sliding-time horizon.

4. The apparatus of claim 1, wherein the compliance-monitoring viewer is also capable of providing a spreadsheet to present the process system information to the user.

5. The apparatus of claim 1, wherein the bars in the bar graph are associated with different manufacturing shifts.

6. The apparatus of claim 1, wherein the process system information comprises status information associated with the resources, information associated with service requests, information associated with on-going operations of the resources, historical information, and statistical information.

7. The apparatus of claim 1, further comprising:
   a monitoring controller capable of monitoring the measurable characteristics associated with the process system.

8. The apparatus of claim 1, wherein the compliance-monitoring viewer is capable of displaying the process system information to enable measurement of an effectiveness of a plan implemented in the process system.

9. The apparatus of claim 1, wherein the process system information identifies the actual compliance to the at least one process plan at a plurality of resolution levels in the process system.

10. The apparatus of claim 9, wherein the plurality of resolution levels comprises: individual ones of the resources, individual operators of one or more of the resources, and individual manufacturing shifts.

11. The apparatus of claim 1, wherein each of multiple sections of the bars identifies a percentage of the tasks that were planned prior to performance by a specified amount of time, at least two sections associated with different specified amounts of time.

12. The apparatus of claim 11, wherein at least one other section of the bars identifies a percentage of the tasks that were not planned prior to performance.

13. The apparatus of claim 12, wherein at least one additional section of the bars identifies a percentage of the tasks having a plan that changed prior to performance.

14. A method, comprising:
   storing a model mathematically representing a plurality of resources and a plurality of tasks associated with a process system, the model also defining relationships involving the resources and the tasks;
   using the model to allocate one or more of the resources among one or more of the tasks based on one or more measurable characteristics associated with the process system, the allocation of the one or more resources among the one or more tasks supporting execution of at least one process plan; and
   displaying process system information to a user, the process system information identifying real-time actual compliance to the at least one process plan during execution of the at least one process plan;
   wherein tasks that have been performed as part of the execution of the at least one process plan comprise diffusion plans associated with a semiconductor facility, wherein at least some diffusion plans are defined and then performed, and wherein a time period exists between the definition of at least one diffusion plan and the performance of that diffusion plan; and
   wherein displaying the process system information comprises providing a bar graph to present at least a portion of the process system information to the user, the bar graph comprising a plurality of bars, at least one of the bars subdivided into multiple sections, the sections associated with different lengths of the time periods between the definitions of the diffusion plans and the performance of the diffusion plans.

15. The method of claim 14, wherein displaying the process system information comprises visualizing the process system information over a sliding-time horizon.

16. The method of claim 14, wherein displaying the process system information further comprises providing a spreadsheet containing the process system information.

17. The method of claim 14, wherein the bars in the bar graph are associated with different manufacturing shifts.

18. The method of claim 14, wherein the process system information comprises status information associated with the resources, information associated with service requests, information associated with on-going operations of the resources, historical information, and statistical information.

19. The method of claim 14, further comprising:
monitoring the measurable characteristics associated with the process system.

20. The method of claim 14, wherein:
each of multiple sections of the bars identifies a percentage of the tasks that were planned prior to performance by a specified amount of time, at least two sections associated with different specified amounts of time;
at least one other section of the bars identifies a percentage of the tasks that were not planned prior to performance; and
at least one additional section of the bars identifies a percentage of the tasks having a plan that changed prior to performance.

21. A process system, comprising:
a plurality of resources; and
a resource allocator capable of allocating the resources among a plurality of tasks, the resource allocator comprising:
a model mathematically representing the resources and the tasks, the model also defining relationships involving the resources and the tasks;
a resource allocation controller capable of using the model to allocate one or more of the resources among one or more of the tasks based on one or more measurable characteristics associated with the process system, the allocation of the one or more resources among the one or more tasks supporting execution of at least one process plan; and
a compliance-monitoring viewer capable of displaying process system information to a user, the process system information identifying real-time actual compliance to the at least one process plan during execution of the at least one process plan;
wherein tasks that have been performed as part of the execution of the at least one process plan comprise diffusion plans associated with a semiconductor facility, wherein at least some diffusion plans are defined and then performed, and wherein a time period exists between the definition of at least one diffusion plan and the performance of that diffusion plan; and wherein the compliance-monitoring viewer is configured to provide a bar graph to present at least a portion of the process system information to the user, the bar graph comprising a plurality of bars, at least one of the bars subdivided into multiple sections, the sections associated with different lengths of the time periods between the definitions of the diffusion plans and the performance of the diffusion plans.

22. The process system of claim 21, wherein the compliance-monitoring viewer is capable of displaying the process system information subdivided into manufacturing shifts.

23. The process system of claim 21, wherein:
the process system information comprises status information associated with the resources, information associated with service requests, information associated with on-going operations of the resources, historical information, and statistical information.

24. A computer program embodied on a computer readable medium and capable of being executed by a processor, the computer program comprising computer readable program code for:
monitoring one or more measurable characteristics associated with a process system;
allocating one or more of a plurality of resources among one or more of a plurality of tasks using a model, the allocating based on the one or more measurable characteristics, the model mathematically representing the resources and the tasks, the model also defining relationships involving the resources and the tasks, the allocation of the one or more resources among the one or more tasks supporting execution of at least one process plan; and
displaying process system information to a user to illustrate compliance, the process system information identifying real-time actual compliance to the at least one process plan during execution of the at least one process plan;
wherein tasks that have been performed as part of the execution of the at least one process plan comprise diffusion plans associated with a semiconductor facility, wherein at least some diffusion plans are defined and then performed, and wherein a time period exists between the definition of at least one diffusion plan and the performance of that diffusion plan; and
wherein displaying the process system information comprises providing a bar graph to present at least a portion of the process system information to the user, the bar graph comprising a plurality of bars, at least one of the bars subdivided into multiple sections, the sections associated with different lengths of the time periods between the definitions of the diffusion plans and the performance of the diffusion plans.

* * * * *